Dec. 12, 1967  A. C. MONAGHAN  3,357,151
ARTICLE PACKAGING
Filed Aug. 4, 1965
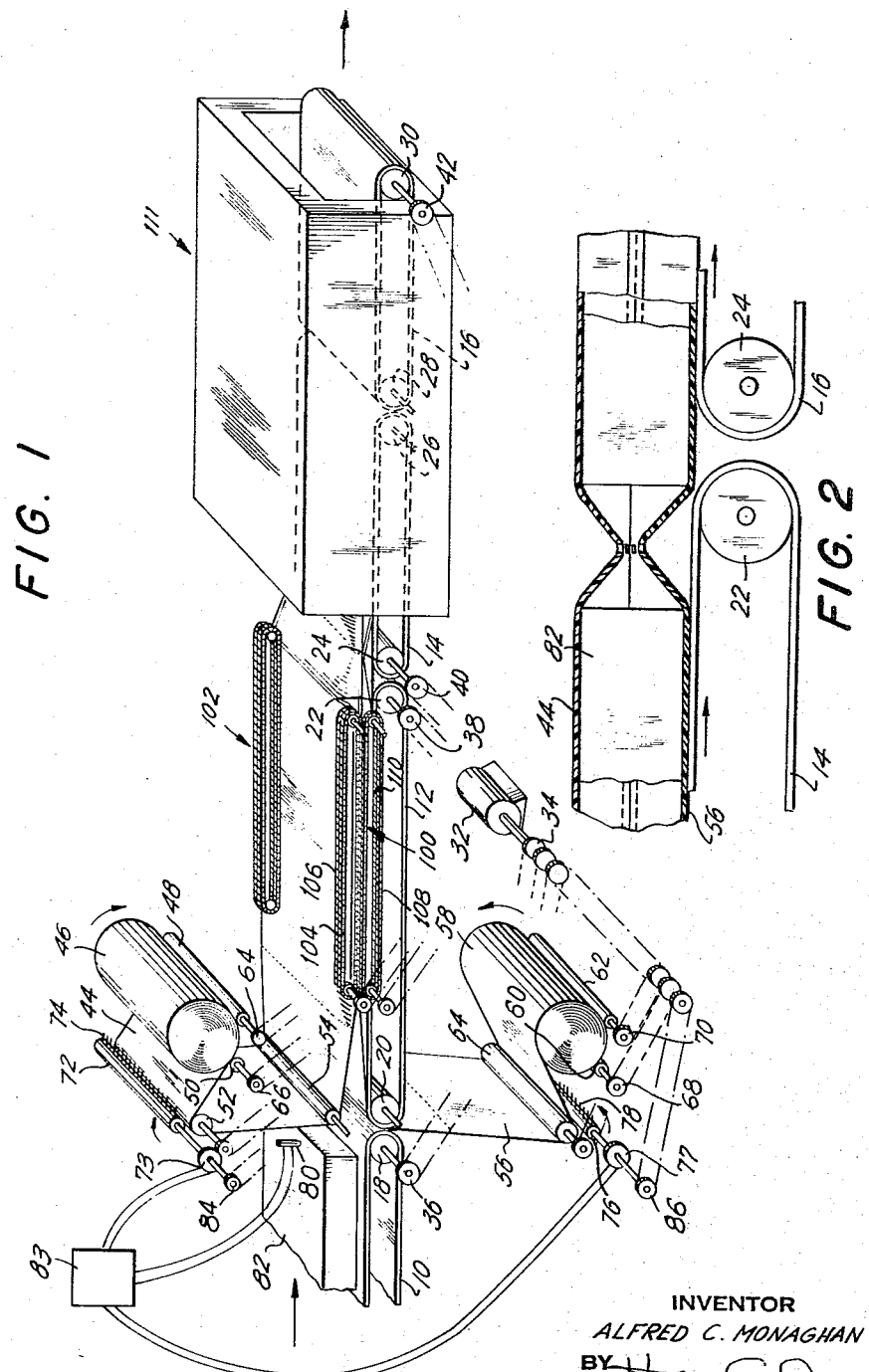
INVENTOR
ALFRED C. MONAGHAN
BY 
ATTORNEY 3,357,151
ARTICLE PACKAGING
Alfred C. Monaghan, Warren Township, Plainfield, N.J., assignor to Weldotron Corporation, Newark, N.J., a corporation of New Jersey.
Filed Aug. 4, 1965, Ser. No. 477,214
8 Claims. (Cl. 53—28)

ABSTRACT OF THE DISCLOSURE

An article wrapping system for articles includes a series of conveyor belts for continuously advancing the articles sequentially in the machine direction; supply rolls for continuously providing two webs to the upper and lower surfaces of each article respectively; intermittently operated combs of needles for perforating each of the two webs along a line on the cross-web axis between successive articles; radiant sealers for continuously joining the two webs together in the machine direction to form a tube about the article; a shrink tunnel for shrinking the tube about the articles, and a final conveyor belt operating at a higher velocity than the preceding belts for accelerating the leading article and rupturing the tube along the lines of perforations immediately behind the leading article.

---

This invention relates to the packaging of articles in a web of thermoplastic material, and particularly to sleeve-wrap or case-pack packaging.

In a sleeve-wrap package the article is wrapped in a tube of film with two opposite ends open. This was previously accomplished by relatively slow, intermittently operated mechanisms which would position an article, wrap a web around the article and seal the web into a sleeve.

It is, therefore, an object of this invention to provide an automatic, continuous motion, high speed, sleeve-wrap machine.

A feature of this invention is the provision of a means for weakening two continuous webs of thermoplastic material at spaced apart intervals along the cross-web axis, means for disposing the articles to be wrapped respectively between said webs and such weakened intervals, means for sealing the two webs together on both sides of the article along the machine direction and means for separating the webs at such weakened intervals.

These and other objects, features and advantages of this invention will become apparent in the following detailed description thereof taken in conjunction with the accompanying drawings in which:

FIG. 1 is a perspective view of an embodiment of the invention; and

FIG. 2 is a front view in elevation of a detail of FIG. 1.

The sleeve-wrapping apparatus includes a conveyor belt 10 for sequentially delivering the articles to be wrapped, a conveyor belt 12 for supporting the article as it is wrapped and sealed, a conveyor belt 14 for transporting the wrapped article into a heat shrinking tunnel, and a conveyor belt 16 for separating the sequential packaged articles from each other and for transporting the wrapped, separated, article from the tunnel. The belt 10 is mounted on suitable guides, not shown, and suitably journaled rollers, of which roller 18 is shown. The belt 12 is of a width substantially equal to the width of the article to be wrapped, and is mounted on suitable guides, not shown, and two suitably journaled end rollers 20 and 22. The belt 14 is mounted on suitable guides, not shown, and two suitably journaled end rollers 24 and 26. The belt 16 is mounted on suitable guides, not shown, and two suitably journaled end rollers 28 and 30.

A motor 32 has a shaft to which a plurality of sprocket wheels 34 are fixed. These sprocket wheels are respectively coupled by suitable sprocket chains to a sprocket wheel 36 fixed to and driving the roller 18, a sprocket wheel 38 fixed to and driving the roller 22, a sprocket wheel 40 fixed to and driving the roller 24, and a sprocket wheel 42 fixed to and driving the roller 30. The conveyor belts 10, 12 and 14 are driven at the same linear velocity, the conveyor belt 16 is driven at a linear velocity about 30% faster.

The upper web 44 of thermoplastic material is unwound from an upper supply roll 46 which is supported by and driven by two suitably journaled peripheral unwind rollers 48 and 50. The upper web passes over a suitably journaled roller 52 which has an outermost surface of a resilient material. The upper web passes under a suitably journaled roller 54. The lower web 56 of thermoplastic material is unwound from a lower supply roll 58 which is supported by and driven by two suitably journaled peripheral unwind rollers 60 and 62. The lower web passes over a suitably journaled roller 64 which has an outermost surface of a resilient material. The web passes between the rollers 18 and 20 and around the roller 20 together with the conveyor belt 12. The unwind rollers 48, 50, 60 and 62 have respective sprocket wheels 64, 66, 68 and 70 fixed thereto, which are driven via respective sprocket chains by respective sprocket wheels 34 on the drive shaft of the motor 32; thereby unwinding the upper and lower webs at the same linear velocity as the advance of the conveyor belts 10, 12 and 14.

A roller 72 is suitably journaled parallel to and spaced slightly from the resiliently surfaced roller 52. A line of needle-like teeth or comb of pins 74 fixedly extend radially from the roller, and when the roller is rotated will just engage or penetrate into the surface of the resiliently surfaced roller 52. A similar roller 76 is suitably journaled parallel to and spaced slightly from the resiliently surfaced roller 64 and has a comb of pins 78. The rollers 72 and 76 are coupled by respective solenoid operated, single revolution clutches 73 and 77, to respective sprocket wheels 84 and 86, which are driven via respective sprocket chains by respective sprocket wheels 34 on the drive shaft of the motor 32, whereby the linear velocity of the tips of the combs 74 and 78 is identical to the linear velocity of the unwind rollers, and the webs as they pass over the respective rollers 52 and 64.

A detector 80, such as a photocell or a microswitch, is disposed above the conveyor belt 10 to sense the passage of the leading edge of an article 82 which is to be wrapped. The detector 80 is coupled to a control circuit 83, such as a relay, which actuates the clutches 73 and 77 to cause the rollers 72 and 76 to execute one revolution. The respective combs of needles form a single row of perforations in the upper and lower webs. Since the tips of the pins are travelling at the same linear velocity, the perforations conform to the cross-section of the pins and are not elongated. The settings of the article detector and the perforating rollers are such that the lines of perforations will be centered between successive packages.

Two continuous radiant heating assemblies 100 and 102 are respectively disposed adjacent each side of the conveyor belt 12. These assemblies are similar to those disclosed in U.S. Patent No. 3,243,330 issued on March 29, 1966 to Seymour Zelnick, and to which reference may be made for details. Briefly, each assembly comprises two spaced apart upper conveyor bands 104 and 106 and two spaced apart lower conveyor bands 108 and 110. The lower runs of the upper bands are in abutment with the upper runs of the lower bands, in a plane of abutment which is advantageously located to bisect the height of the article being wrapped. An upper radiant heating element is disposed between the upper bands, above and adjacent the plane of abutment. A lower radiant heating element is disposed between the lower bands, below and adjacent the plane of abutment. The conveyor bands are passed around suitable drive pulleys which are driven by suitable sprocket wheels which are driven by the motor 32, so that the conveyor bands have the identical linear velocity as the webs.

The superposed marginal edges of the webs are caught between the upper and lower conveyor bands of the continuous radiant heating assemblies and are continuously sealed together, as described in the Zelnick application, supra. Each article, as it leaves the conveyor belt 10 enters between the upper and lower webs 44 and 56 and as they pass between the continuous radiant heating assemblies the two webs are joined around the article, as a tube with two seams.

The continuous tube with the sequential articles therein is transported by the conveyor belt to the conveyor belt 14. This belt 14 extends into a heat shrinking tunnel 111, such as is disclosed in U.S. Patent No. 3,316,653 issued on May 2, 1967 to Seymour Zelnick. Briefly, this tunnel is a chamber wherein heated air is directed at the webs which are advantageously made of heat shrinkable film to shrink the webs about the article, as shown in FIG. 2. When the preceding article leaves the conveyor belt 14 and is advanced by the faster moving conveyor belt 16, the webs rupture under the resulting tensile stress along the lines of perforation between the articles, thus separating the preceding wrapped article from the succeeding articles. Further heating in the tunnel causes the short sections of tubing to shrink tightly about the article, which is delivered from the tunnel by the conveyor belt 16.

While a preferred embodiment of the invention has been shown and described, it will be understood that various changes may be made in the present invention without departing from the underlying idea or principles of the invention within the scope of the appended claims.

What is claimed is:

1. Means for wrapping an article, comprising: first means for continuously advancing the article in the machine direction; second means for continuously providing two webs to two opposite surfaces of the article respectively; third means for intermittently weakening the two webs along the cross-web axis; fourth means for continuously joining the two webs together in the machine direction to form a tube; said first means including means for tensioning the webs after the two webs have been joined together to rupture the webs where they have been weakened to separate the article and the adjacent web portions from the remainder of the webs following the article.

2. Means for wrapping a plurality of articles, comprising: first means for continuously advancing the articles sequentially in the machine direction; second means for continuously providing two webs to two opposite surfaces of the article respectively; third means for intermittently weakening the two webs along the cross-web axis at spaced apart intervals disposed between successive articles respectively; fourth means for continuously joining the two webs together in the machine direction to form a tube; said first means including means for tensioning the portions of the webs adjacent the leading article after these portions have been joined together to rupture the webs where they have been weakened between the leading article nd the next succeeding article to separate the leading article and the adjacent web portions from the remainder of the webs following the leading article.

3. Means for wrapping a plurality of articles, comprising: first means for continuously advancing the articles sequentially in the machine direction; second means for continuously providing two webs to two opposite surfaces of the article respectively; third means for intermittently perforating each of the two webs along a line on the cross-web axis at spaced apart intervals disposed between successive articles respectively; fourth means for continuously joining the two webs together in the machine direction to form a tube; said first means including means for tensioning the portions of the webs adjacent the leading article after these portions have been joined together to rupture the webs along the lines of perforations between the leading article and the next succeeding article to separate the leading article and the adjacent web portions from the remainder of the webs following the leading article.

4. Means for wrapping a plurality of articles, comprising: a conveyor system for continuously advancing the articles sequentially in the machine direction; supply means for continuously providing two webs to the upper and lower surfaces of each article respectively; perforating means for intermittently perforating each of the two webs along a line on the cross-web axis at spaced apart intervals disposed between successive articles respectively; sealing means for continuously joining the two webs together in the machine direction to form a tube about each sequential article; heating means for shrinking the tube about the leading article; said conveyor system including means for accelerating the leading article after the tube has been shrunk at least partially thereabout, to rupture the webs along the lines of perforations between the leading article and the next succeeding article to separate the leading article and the tube portions thereabout from the remainder of the webs following the leading article.

5. Means for wrapping a plurality of articles, comprising: a first conveyor system for continuously advancing the article sequentially in the machine direction at a first linear velocity; supply means for continuously providing at the first linear velocity two webs to the upper and lower surfaces of each article respectively; perforating means for intermittently perforating each of the two moving webs along a line on the cross-web axis at spaced apart intervals disposed between successive articles respectively; sealing means for continuously joining the two webs together in the machine direction to form a tube about each sequential article; heating means for shrinking the tube about the leading article; a second conveyor system for receiving the articles from the first conveyor system and for continuously advancing the articles at a second linear velocity which is greater than said first linear velocity, for accelerating the leading article after the tube has been shrunk at least partially thereabout, to rupture the webs along the lines of perforations between the leading article and the next succeeding article to separate the leading article and the tube portion thereabout from the remainder of the webs following the leading article.

6. Means for wrapping a plurality of articles, comprising: a first conveyor system for continuously advancing the article sequentially in the machine direction at a first linear velocity; supply means for continuously providing at the first linear velocity two webs to the upper and lower surface of each article respectively; perforating means for each web respectively, including a roller adjacent the web having a comb of projections fixedly extending radially therefrom, means for intermittently rotating said roller so that the distal ends of said projections penetrate the web with a linear velocity equal to said first linear velocity to form a line of perforations on the cross-web axis at spaced apart intervals disposed between successive articles respectively; sealing means for continuously joining the two webs together in the machine direction to form a tube about each sequential article; heating means for shrinking the tube about the leading article; a second conveyor system for receiving the articles from the first conveyor system and for continuously advancing the articles at a second linear velocity which is greater than said first linear velocity, for accelerating the leading article after the tube has been shrunk at least partially thereabout, to rupture the webs along the lines of perforations between the leading article and the next succeeding article to separate the leading article and the tube portion thereabout from the remainder of the webs following the leading article.

7. A method of wrapping a plurality of articles comprising: continuously advancing the article sequentially along a path at a first given velocity; continuously supplying two webs to the upper and lower surfaces of each article respectively at the first given velocity in the direction of said path; intermittently perforating each of the two moving webs along a line across said path at spaced apart intervals disposed between successive articles respectively; continuously joining the two moving webs together in the direction of said path along the two sides of the article to form a tube about each sequential article; accelerating the leading article after the tube has been formed thereabout to rupture the webs along the lines of perforations between the leading article and the next succeeding article to separate the leading article and the tube portion thereabout from the remainder of the webs following the leading article.

8. A method of wrapping a plurality of articles comprising: continuously advancing the article sequentially along a path at a first given velocity; continuously supplying two webs to the upper and lower surfaces of each article respectively at the first given velocity in the direction of said path; intermittently perforating each of the two moving webs along a line across said path at spaced apart intervals disposed between successive articles respectively; continuously joining the two moving webs together in the direction of said path along the two sides of the article to form a tube about each sequential article; heating the tube about the leading article to at least partially shrink the tube about the article; accelerating the leading article after the tube has been shrunk at least partially thereabout to rupture the webs along the lines of perforations between the leading article and the next succeeding article to separate the leading article and the tube portion thereabout from the remainder of the webs following the leading article.

References Cited
UNITED STATES PATENTS

| | | | |
|---|---|---|---|
| 2,563,071 | 8/1951 | Salfisberg | 53—28 |
| 3,014,320 | 12/1961 | Harrison | 53—30 XR |

GRANVILLE Y. CUSTER, Jr., *Primary Examiner.*